July 26, 1938. C. D. BARBULESCO 2,124,533
ULTRAHIGH FREQUENCY MARKER BEACON SYSTEM
Filed Feb. 4, 1935 4 Sheets-Sheet 1

INVENTOR
CONSTANTIN D. BARBULESCO
BY
ATTORNEYS

July 26, 1938.  C. D. BARBULESCO  2,124,533
ULTRAHIGH FREQUENCY MARKER BEACON SYSTEM
Filed Feb. 4, 1935  4 Sheets-Sheet 3

INVENTOR
CONSTANTIN D. BARBULESCO
BY
ATTORNEYS

July 26, 1938.  C. D. BARBULESCO  2,124,533
ULTRAHIGH FREQUENCY MARKER BEACON SYSTEM
Filed Feb. 4, 1935  4 Sheets-Sheet 4

INVENTOR
CONSTANTIN D. BARBULESCO
BY
ATTORNEYS

Patented July 26, 1938

2,124,533

UNITED STATES PATENT OFFICE 2,124,533

ULTRAHIGH FREQUENCY MARKER BEACON SYSTEM

Constantin D. Barbulesco, Dayton, Ohio

Application February 4, 1935, Serial No. 4,921

25 Claims. (Cl. 250—11)

(Granted under the act of March 3, 1883, as amended April 30, 1928; 370 O. G. 757)

The invention described herein may be manufactured and used by or for the Government for governmental purposes, without the payment to me of any royalty thereon.

My invention relates generally to a novel method of and means for transmitting and receiving radiant energy and more particularly for transmitting and receiving electromagnetic energy of ultra-high frequency as an aid to the navigation of vehicles either on the ground, in the air, on the water, or under the water, and as an aid in the prevention of collision of such vehicles either among themselves or against obstacles.

The principle of my invention will be readily understood when it is remembered that the electromagnetic waves of very short length are very similar to light, the difference being that they do not affect any of the human senses and therefore a receptor is needed to make their presence known.

My invention has for one of its objects to provide a simple, efficient and economical ultra-high frequency signalling system.

Another object of my invention is to associate a projecting means for bundling radiant energy of ultra-high frequency with a directional receiving means in such a manner that the presence of such radiant energy is detected in accordance with a predetermined virtual beam.

A further object of my invention is to provide a novel receiving means that is directionally responsive to an existing projected beam of radiant energy in accordance with predetermined relative displacements of said receiving means and the plane of the polarization of the energy in the said beam.

Another object of my invention is to provide a novel ultra-high frequency projector that will radiate in space a well defined beam of electromagnetic energy that is constant in frequency, form and spread.

A further object of my invention is to provide a novel indicating means adapted to cooperate with a radio receptor and having novel means for signaling in response to the received electromagnetic energy to which the receptor is tuned.

A still further object of my invention is to provide a novel combination of ultra-high frequency projecting and receiving means having directional characteristics in predetermined relation for producing in space virtual beams of desired characteristics as a function of said relation and as a function of their relative displacements.

A still further object of my invention is to provide a more efficient receiving means for high and ultra-high frequency electro-magnetic energy.

A still further object of my invention is to provide a more efficient amplification and detecting means for high and ultra-high frequency electromagnetic energy.

A further object of my invention is to associate a doublet antenna with an oscillator or detector in such a manner that the freedom of oscillation of said antenna is unrestrained by the presence of its associated circuit.

A still further object of my invention is to provide a novel arrangement of doublet antenna and a vacuum tube detector in which the input and output circuits of said detector are symmetrically connected to said doublet so that oscillations are simultaneously impressed upon the grid and plate that are substantially 180° out of phase.

The invention, as herein illustrated, is described in connection with the navigation and landing of aircraft under conditions of poor visibility when it is necessary to locate with great precision known geographical positions along the course of the aircraft or along its gliding path in negotiating a blind landing.

The signalling system embodying my invention comprises a projecting means, a receiving means and an indicating means.

The projecting means, comprises a generator of ultra-high frequency A, a radiating means B, a power converter C and a source of supply D.

Figures 1, 2, 3:
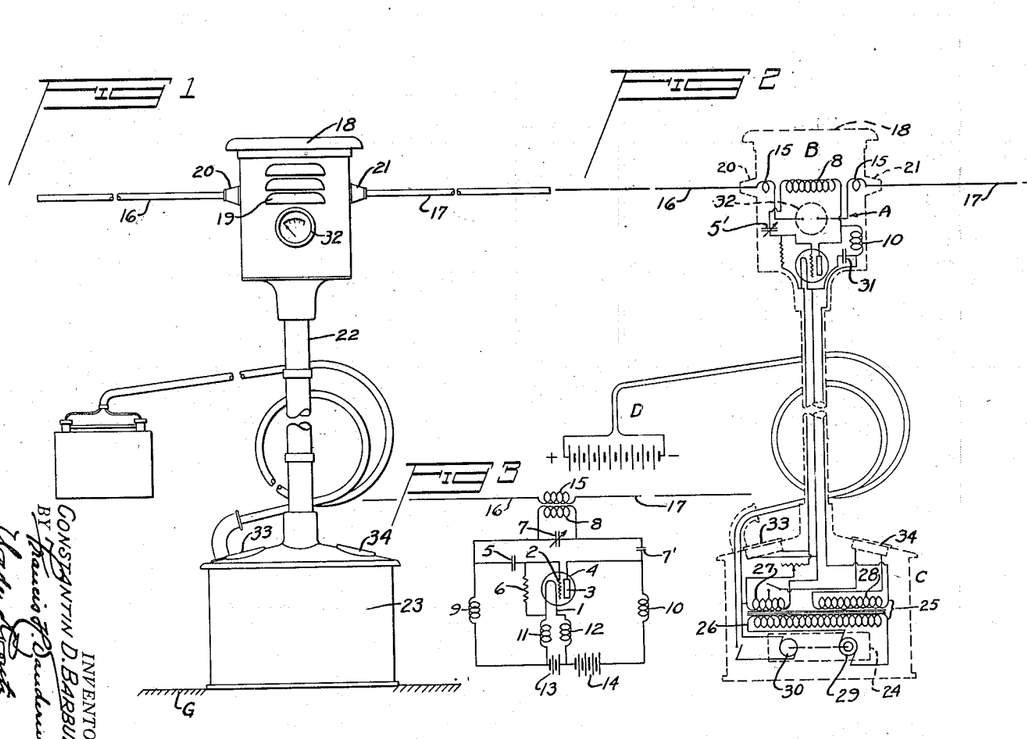
Fig. 1 is a front elevational view of the projector embodying my invention.
Fig. 2 is a diagrammatic view showing the circuit arrangements within the projector shown in Fig. 1, the physical structure being shown in phantom.
Fig. 3 is a modification of the circuit shown in Fig. 2.

The projecting means, as shown in Figs. 1 and 2, is arranged as a portable unit. This unit comprises a removable head that constitutes a casing for a generating means A and is detachably connected to a column, which in turn is fixedly attached to a base. Projecting from opposite sides of the head and insulated therefrom are rigid arms made of copper or aluminum tubing that constitute with the head a doublet antenna B, as will be hereinafter described. The generating means is connected through a power line to a converter C that is disposed within the base. Power is supplied to the converter from a source of supply such as a heavy battery D.

The generating means comprises a constant frequency oscillating circuit as shown in Fig. 3. The principle of operation of the circuit is described in my Patent No. 1,874,222.

A vacuum tube having a filament 1, a grid 2 and a plate 3 in an evacuated glass container 4 generates the oscillations. A grid condenser 5 associated with a grid leak or grid resistor 6 produces the proper bias on the grid of the oscillating tube. A tank circuit comprising a large condenser 7 and a small inductance 8 is connected across the grid and the plate of the tube. A blocking condenser 7' of large value prevents the passage of direct current. The choke coils 9, 10, 11 and 12 insulate the ultra-high frequency oscillations from the sources of power 13 and 14, which are at ground potential. The ultra-high frequency energy is transferred from the tank circuit into a loading coil 15 inserted in the middle of a doublet antenna 16 and 17.

In order to prevent asymmetry in the distribution of the current and voltage along the doublet, the grid and plate of the oscillating tube are maintained at equal, high frequency potentials with respect to the middle point of the coil 8, which assumes ground potential and coincides with the nodal point of the doublet.

Referring to Fig. 2, wherein a practical realization of the projector is shown, it will be seen that the oscillatory circuit proper is enclosed in the metallic head 18, which shields the oscillator circuit and prevents the direct radiation of coil 8 to interfere with the normal radiation of the doublet antenna. As heretofore noted, the two sides 16 and 17 of the antenna are brought out of the shield through two insulators 20 and 21. Substantial capacitance, however, is provided between the shield and the antenna through the insulators to permit capacitive coupling between the antenna and the shield. This is done for the purpose of diverting enough current into the shield from the loading coil 15 so that the sinusoidal distribution of voltage and current in the doublet remain undisturbed. In other words, the shield by-passes the middle portion of the antenna current and constitutes the middle portion of the doublet. As in the center of the doublet, the voltage is zero, the shield can be grounded, and practically is grounded, through the metal column 22 and the lower case.

The converter consists of a motor generator 24 and a transformer 25 having a primary winding 26, a secondary winding 27 for the filament, and another secondary 28 for the plate. The projector illustrated herein is especially designed for field operation and therefore raw alternating current of low frequency, such as 60 cycles, which is readily available, is supplied to both plate and filament from the alternator 29 driven by the motor 30, which derives its power from the battery D.

The antenna B is normally disposed in a horizontal position at a height of a quarter wave above the ground surface or any suitable metallic reflector. This arrangement permits the elimination of the choke coils 9, 11 and 12, and therefore a simplification of the circuit. This is possible due to the fact that the leads to the filament are quarter wave long and constitute the most perfect choke for the frequency at which the oscillator is operated.

A by-pass condenser 31 is shunted across the secondary 28 of the transformer 25, lowering the impedance of the plate circuit and thus facilitating the oscillations.

The radiation of the antenna is indicated by a high frequency ammeter 32 inserted in the center of the doublet and mounted in the head. An alternating current voltmeter 33 is shunted across the filament terminals and a direct current milliammeter 34 is in the plate circuit return to indicate the emission of the tube. These indicators are mounted in the lower housing 23.

At extremely high frequencies even the condenser 7 can be dispensed with because the distributed capacity of the coil 8 and the interelectrode capacity between plate and grid in parallel, are sufficiently large for the tank circuit. In this case the tuning within narrow limits can be accomplished by the grid condenser 5', which is made variable.

Figure 4:
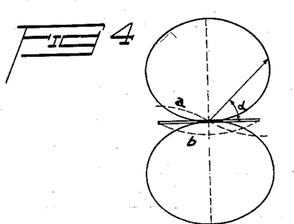
Figs. 4 and 5 are respectively front and side elevational views of the field patterns produced by a doublet antenna.
Figure 5:
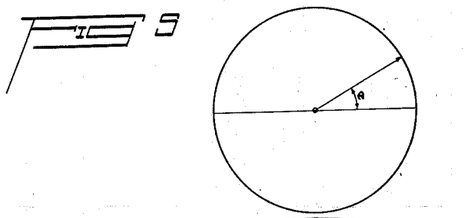

The distribution of voltage and current in the doublet are respectively represented by the curves $a$ and $b$ in Fig. 4. If the doublet in isolated in space far from reflecting surfaces the pattern of the radiated field in its own plane and in the equatorial plane is as shown in Figs. 4 and 5 respectively.

In any plane of the antenna the field from the center in different directions varies with the angle in accordance with the formula:

$$E = M = \frac{2 I_o}{d} \frac{\cos\left(\frac{\pi}{2}\cos\alpha\right)}{\sin\alpha}$$

Where E is the electric field, M the magnetic field and $I_o$ the current at the center of the antenna, it is maximum for $\alpha = \frac{\pi}{2}$ and zero for $\alpha = 0$.

In other words, the maximum radiation is in a direction perpendicular to the direction of the antenna and the radiation is zero in the direction of the antenna proper. In the equatorial plane the field intensity remains the same at the same distances from the center, as shown in Fig. 5.

Figure 6:
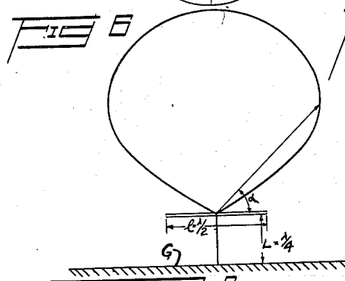
Figs. 6 and 7 show respectively front and side elevations of field patterns when a doublet antenna is arranged in accordance with my invention.
Figure 7:
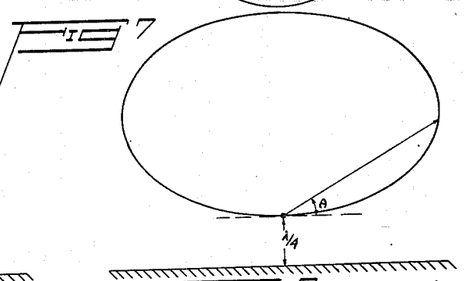

When the doublet is disposed at a distance of a quarter wave above the surface of the ground G or any reflecting surface, reflection takes place and a field pattern is produced of a character as shown in Figs. 6 and 7. In the zenithal direction of the center of the antenna the field is reinforced because the reflected energy is in phase with the energy radiated directly by the antenna. The field pattern discloses a fan-shaped beam with the plane of the fan perpendicular to the direction of the antenna.

Figure 10:
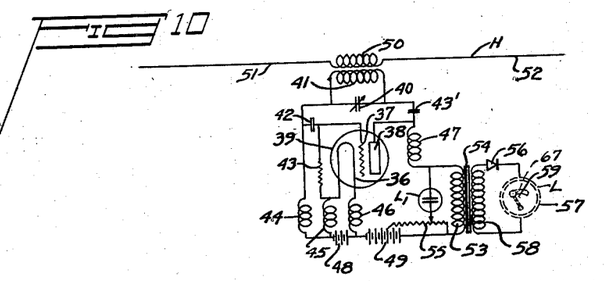
Fig. 10 is a circuit diagram of the receptor device.

The receiving circuit, as illustrated in Fig. 10, is similar to the constant frequency circuit used in the transmitter and is employed where the carrier frequency is modulated. This circuit comprises a vacuum tube having a filament 36, a grid 37, and a plate 38 in an evacuated glass container 39.

A tank circuit having a large capacity 40 and small inductance 41 is connected between said plate and grid. The proper bias on the grid is produced by the grid condenser 42 and the grid resistor 43. A blocking condenser 43' insulates the tank circuit from the direct current plate voltage. A plurality of choke coils 44, 45, 46 and 47 prevent the leakage of the high frequency induced in the tank circuits into the sources of supply 48 and 49, which are maintained at ground potential.

A doublet having a loading coil 50 is inductively coupled to the tank circuit. The two halves 51 and 52 of the doublet will absorb energy from the field and transfer it to the tank circuit, which is tuned exactly to the frequency of the energy radiated by the projector.

Any suitable indicating apparatus may be employed with this detector circuit for indicating the presence of the signal. For example, a neon lamp when connected across the terminals of the primary 53 of the iron core transformer 54 will serve this purpose. A potentiometer 55 is adjusted to polarize the tube just below the point or voltage for which the gaseous discharge starts. After detection the audio component builds sufficient additional alternating voltage across the transformer to flash the neon tube.

Where a more striking signal is needed as, for example, to warn a pilot of an airplane in effecting a blind flight, I prefer to employ a different type of indicating means. I have spent considerable time in developing sensitive relays to operate on the output of the detector to close a local circuit for flashing a light on the instrument board. I found that the energy after detection is exceedingly small and that the sensitive relays required for this purpose were readily upset by the vibration of the airplane. In order, therefore, to produce a flash of light with the minute amount of energy available I have associated a direct current meter with the detector circuit and with a single lighting circuit in such manner that while each operates independently of the other the effect of the latter is not made known until the former is in operation.

This indicating means comprises a well-known A. C. converting circuit that is connected across the terminals of a secondary 58 of the transformer 54 and a direct current meter L that is provided with a light bulb 60, the light rays of which are observed when the needle of the meter is actuated away from its zero position.

Figure 13:
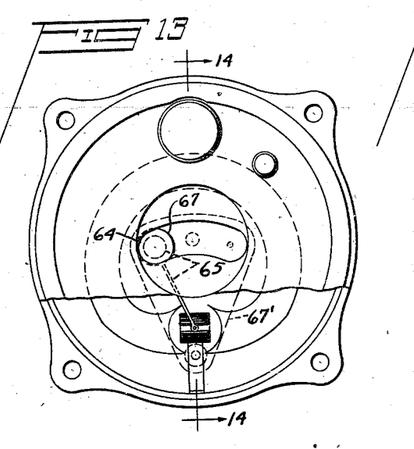
Fig. 13 is a front elevation with parts broken away showing a direct current indicator of a well-known type embodying my invention.
Figure 14:
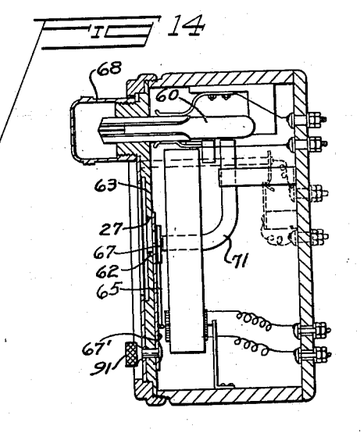
Fig. 14 is a cross-sectional view taken on the line 14—14 of Fig. 13.

A preferred embodiment of the meter and bulb arrangement is shown on Figs. 13 and 14, wherein the bulb 60 is shown mounted between suitable spring contacts and arranged at one end of a bent glass rod 71. The other end of the rod is disposed immediately behind an opening 62 formed in the card 63, which opening is normally maintained shut by means of a disk 67 carried by the pointer 65. It will be seen that when the alternating current component in the plate circuit of the detector is rectified by the contact-type rectifier 56, the needle 65 will be actuated, thus uncovering the opening 62 and the light rays will be projected therethrough to thereby produce a light flash signal. The size of the light opening may be varied by means of an adjustable disk 67' having a series of openings of different size. It will be noted that the light bulb is inserted into the meter case from the front side thereof through an opening that is covered by a cap 68. This will facilitate replacement of bulb when necessary.

Figure 12:
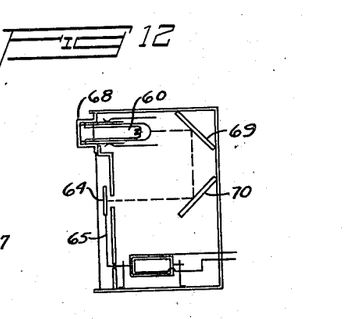

A variation of the arrangement of the bulb is shown in Fig. 12, wherein reflecting surfaces 69 and 70 are used instead of the bent rod 71.

Figure 11:
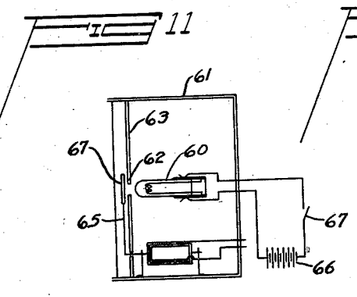
Figs. 11 and 12 are schematic diagrams of an indicator embodying my invention.

A more simple form of bulb arrangement is shown in Fig. 11, wherein the light bulb is disposed immediately behind the opening, thus light rays are projected directly from the bulb through the opening.

Figures 15, 16, 17, 18:
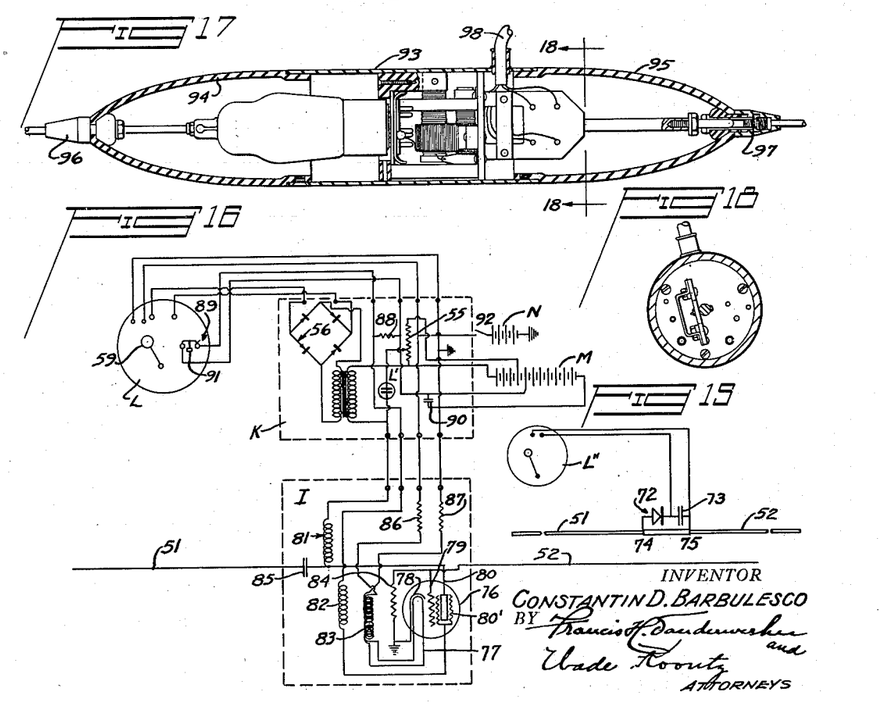
Fig. 15 is a circuit diagram of a further embodiment of my invention.
Fig. 16 is a circuit diagram of a practical embodiment of my invention.
Fig. 17 is a longitudinal sectional view of a receptor device embodying my invention.
Fig. 18 is a cross-section taken on the line 18—18 of Fig. 17.

In Fig. 15 a simple crystal detector 72 is used in series with a by-pass condenser 73 connected symmetrically across the central portion of the doublet antenna. The indicator L" is connected across the condenser 73. This novel arrangement will not interfere with the natural mode of vibration of the doublet and will not introduce any resistance in the antenna circuit.

Between the points 74 and 75 a high frequency voltage is developed by the electromotive force induced in the antenna by the field. This voltage produces a current in the detector circuit 72 which is rectified and charges the condenser 73, which in turn become a source of direct current for actuating the indicator L". This arrangement will operate on a modulated or unmodulated carrier and finds practical application as an auxiliary inexpensive means of marking the boundary of a landing field or the center of the field by flashing a red light that is disposed within indicator L". The sensitivity of the arrangement just described is obviously small and I prefer to use it for low altitudes or small distances.

For higher altitudes I prefer a vacuum tube detector of high sensitivity, as illustrated in Fig. 16. In this view, a vacuum tube 76 of the screen grid type is shown. The filament is of the heater type, having a filament proper or heater 77 and a cathode 78 heated indirectly by the said heater. The grid 79 and the plate 80 are directly connected respectively to the ends of the two halves 51 and 52 of the doublet antenna H.

The screen electrode 80' is interposed between the said grid and plate and decreases the capacity between these electrodes.

A plurality of choke coils 81, 82 and 83 insulate all the electrodes of the tube from the ground by preventing leakage of the high frequency intercepted by the antenna and transferred to said electrode. The grid leak 84 produces a suitable bias on the grid, while the blocking condenser 85 insulates the antenna 51 from the high voltage applied to the plate. Two resistors 86 and 87 are used for cutting down the voltage of the filament battery N to the proper value needed by the filament. The plate battery M energizes the plate 80 and the screen grid 80'. A resistor 88, shunted in normal position by the test switch 89, is inserted in the screen grid circuit for test purposes as hereinafter described. The condenser 90 is a by-pass condenser lowering the plate circuit resistance.

The rest of the circuit is enclosed in the junction box K and indicator L, which has been already described in connection with Fig. 10. The operation of the test switch 89 is as follows: When it is desired to know if the receptor is operating properly the switch 92 is closed and the button 91 of the test switch 89 is pressed. The said switch 89 is closed in normal position and shunts the resistor 88. When the button is pressed, this resistor is introduced in the screen circuit and changes suddenly the value of the screen grid voltage, which in turn produces a sudden fluctuation in the plate current. The electric impulse is rectified by the rectifier 56 and produces a sudden deflection of the needle in the meter L. When the button is released the switch shunts the resistor again and another impulse is produced in the meter. The same switch 92 closes the battery N on both the filament 77 of the battery and the lamp 60 shown in the diagram of connections, Fig. 16.

Figure 19:
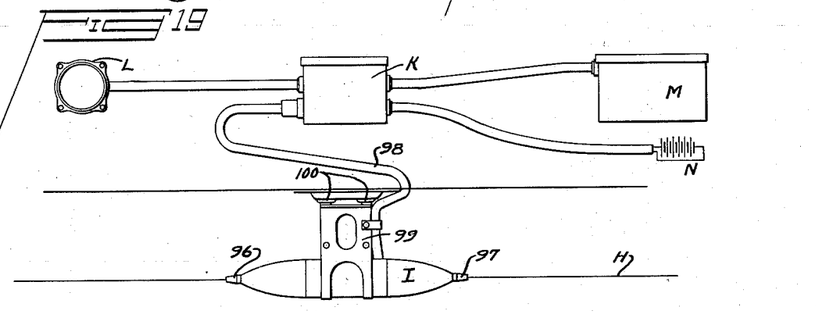
Fig. 19 is an assembly view of the constituent parts of the receptor circuit system.

Fig. 17 shows a longitudinal section through the detector I which is enclosed in a streamline shell composed of a cylindrical middle section 93 and two removable caps 94 and 95. The two halves of the doublet H enter the shell through the insulators 96 and 97. A shielded cable 98 brings the power from the batteries M and N through the junction box K shown in Fig. 19. The detector housing is constructed water- and weather-proof for outdoor operation and is supported when installed by the bracket 99 provided with four rubber shock absorbers 100 to take up the vibrations of the vehicle upon which it is mounted.

Figure 20:
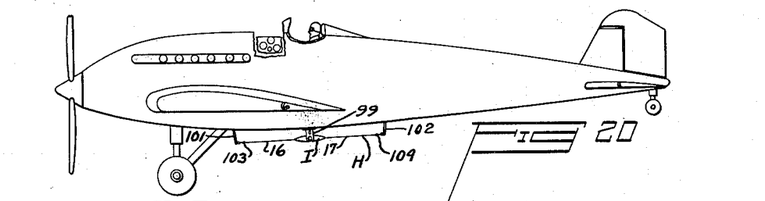
Fig. 20 is a side elevational view of an airplane to which the receptor circuit system is applied.

Fig. 20 shows how the detector is mounted under the fuselage of an airplane parallel to the longitudinal axis. The terminals of the antenna are supported by two small brackets 101 and 102 through the insulators 103 and 104. This symmetrical installation is preferred although the device will operate as well if installed under the wings or elsewhere under the body of the aircraft. It cannot be installed, however, above the metallic structure of the aircraft because this structure will screen the energy of the beam from the receptor and no signal will be intercepted.

Figures 8, 9:
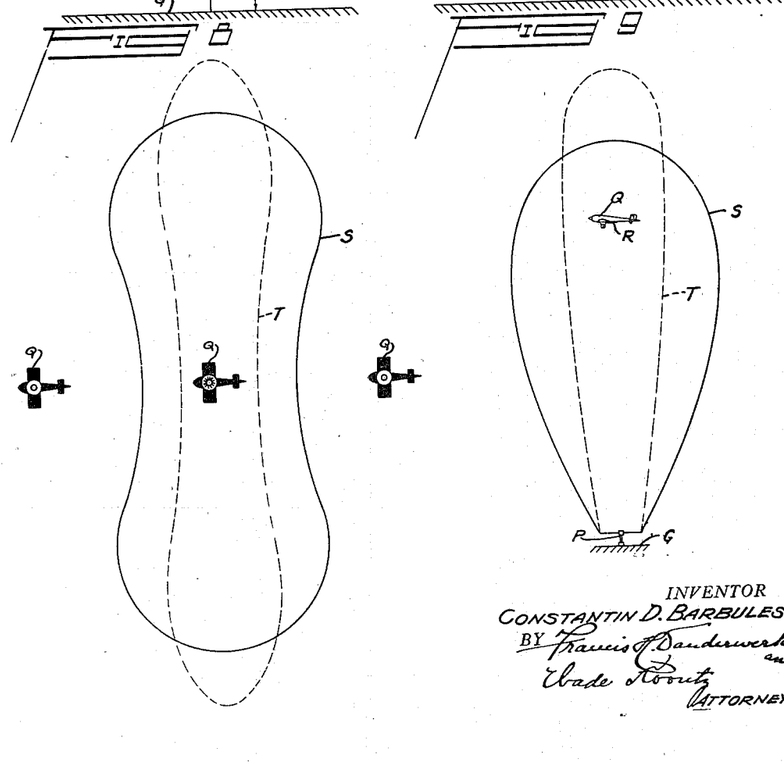
Figs. 8 and 9 show field patterns of the actual and virtual beams in solid and dotted lines respectively for the novel combination of doublet antennae relationship.

Figs. 8 and 9 illustrate a horizontal and vertical section through the fan-shaped beam produced by the projector P and the displacement of the receptor R through the beam in a typical blind landing operation of an airplane Q. The contour S represents the loci of points in space having a field strength sufficient to operate the indicator and flash the signal on the airplane if the receptor is provided with a non-directional antenna. This beam has been found in actual practice to be too broad. I have associated, therefore, with the receptor a directional antenna H of the doublet type which is installed parallel to the direction of flight of the airplane Q.

In the landing process the line of approach of the airplane is known in advance and the projector P is disposed on the ground so that its doublet antenna is also arranged parallel to the line of flight. The airplane, therefore, displaces the receptor antenna parallel to the projector antenna or parallel to the plane of polarization of the energy in the beam. The combined effect of the relative displacement of the two directional antennae appears to the navigator as a virtual beam T, which is twice as narrow as the real beam S in the direction of flight and which has a greater lateral spread. In other words, on account of the directional characteristic of the receiving antenna the airplane penetrates deep into the beam before a sufficient electromotive force is induced in the receiving antenna to actuate the flasher.

It is obvious, therefore, that by relative and predetermined displacements of the transmitting and receiving directional antennae I can modify at will the shape of any beam and realize on an aircraft effects of virtual beams which have considerable value as an aid to navigation in poor visibility.

During the landing operation, the pilot has to watch many other instruments and knowledge of his position with respect to the boundary of the field should be brought to him not only with great precision but the signal must be also of such nature that it will not escape the notice of the pilot no matter how busy he is watching and interpreting other flight instruments. Of particular importance is the proper position at which he should start the glide into the landing field. Another important position is the boundary of the landing area and also the center of this area.

Taking into consideration these conditions, I have provided the indicator L with a powerful light bulb, which is capable of attracting the attention of the pilot even if he is not looking at the instrument the moment it is actuated by the signal.

As it can be judged from the above description, the equipment used either on the ground or on the vehicle is light, simple and economical. It occupies little space and cannot be disturbed by static or distant stray radiations. The projector also has a limited range and the energy being projected upwards will not produce any interference with ultra-short wave receivers operating on the same frequency in the same area.

The operation of the receptor on the aircraft is also very simple. The only operation required from the pilot before using the device is to throw in the filament switch 92 and to check the operation by pressing the button 91 on the test switch 89, as already explained.

I claim:

1. In a system for generating and projecting radiant energy of ultra-high frequency in a substantially vertical direction with respect to an aircraft landing field, antenna means, reflecting means associated with said antenna means and parallelly spaced therefrom substantially one-quarter wave length of the radiated energy, means for generating said energy and for transferring the same to said antenna means at a point of substantially minimum potential thereof for projection above the landing field, and means disposed adjacent said antenna means for neutralizing certain undesired radiation components.

2. In a system for generating and projecting radiant energy of ultra-high frequency in a substantially vertical direction with respect to an aircraft landing field, antenna means, reflecting means associated with said antenna means and parallelly spaced therefrom substantially one-quarter wave length of the radiated energy, means for generating said energy and for transferring the same to said antenna means, said generating and transferring means being disposed within the field of radiated energy and shielding means for said generator to prevent stray radiation of the generated energy from interfering with the radiation from said antenna means and operating to neutralize certain undesired radiation components of the projected energy from said antenna means whereby the projection of energy is effected in a relatively narrow zone in a plane normal to the axis of said antenna means.

3. In a system for generating and projecting radiant energy of ultra-high frequency in a substantially vertical direction with respect to an aircraft landing field, antenna means, reflecting means associated with said antenna means, and parallelly spaced therefrom a distance equivalent to substantially one-quarter wave length of the radiated energy, means for generating said energy and for transferring the same to said antenna at a point of substantially minimum potential, said generating and transferring means being symmetrically coupled with respect to the nodal point of said antenna, and means disposed adjacent said antenna means for neutralizing certain undesired radiation components whereby radiation of energy is effected in a relatively narrow zone in a plane substantially normal to the axis of said antenna means.

4. In a system for generating and projecting radiant energy of ultra-high frequency, antenna means, reflecting means associated with said antenna means and parallelly spaced therefrom a distance equivalent to substantially one-quarter wave length of the radiated energy, means for generating said energy and for transferring the same to said antenna at a point of substantially minimum potential, said generating and transferring means being arranged symmetrically with respect to and substantially at the nodal point of said antenna means, and a metallic shield enclosing said generating and transferring means and electrically coupled to said antenna and operating to neutralize certain of the radiation components whereby radiation from said antenna means is effected in a relatively narrow zone in a plane substantially normal to the axis of said antenna means.

5. In a system for generating and projecting radiant energy of ultra-high frequency in a substantially vertical direction with respect to an aircraft landing field, antenna means including a doublet and a reflecting means, an ultra-high frequency generator connected with said antenna means, and means suitably spaced from and disposed in symmetrical relation with said doublet for shaping the projected beam in a confined zone extending in a plane substantially normal to the axis of said doublet.

6. Means for projecting a beam of ultra-high frequency radiant energy comprising a doublet having a pair of spaced but aligned sections, an ultra-high frequency generating circuit coupled to and disposed approximately at the nodal point of said doublet and between the aligned sections thereof and shielding means for said circuit extending around the spaced adjacent ends of said doublet and operating to prevent interference between the respective fields of said doublet and said circuit.

7. Means for projecting a beam of ultra-high frequency radiant energy comprising a doublet having a pair of spaced but aligned sections, an ultra-high frequency oscillating circuit coupled to and disposed approximately at the nodal point of said doublet and located between the adjacent ends of the sections of said doublet, a source of power associated with said circuit and a metallic shield capacitively coupled to said doublet and enclosing said circuit and operating to prevent interference between the respective fields of said doublet and said circuit.

8. Means for projecting a beam of ultra-high frequency radiant energy comprising a doublet, an ultra-high frequency oscillating circuit coupled to and disposed approximately at the nodal point of said doublet, a source of power associated with said circuit and a metallic shield capacitively coupled to said doublet at approximately its nodal point to constitute a part thereof, and enclosing said circuit and operating to prevent interference between respective fields of said doublet and said circuit.

9. Means for projecting a beam of ultra-high frequency radiant energy comprising a doublet, an ultra-high frequency oscillating circuit coupled to and disposed approximately at the nodal point of said doublet, a source of power associated with said circuit and a support for said doublet and the oscillating circuit coupled therewith comprising a metallic shield capacitively coupled to said doublet and enclosing said circuit and operating to prevent interference between the respective fields of said antenna and said circuit.

10. Means for projecting a beam of ultra-high frequency radiant energy comprising a doublet, an ultra-high frequency oscillating circuit symmetrically coupled to and disposed approximately at the nodal point of said doublet, a source of power associated with said circuit and a pedestal-like support for said doublet comprising a metallic shield capacitively coupled to said doublet and enclosing said circuit and operating to prevent interference between the respective fields of said antenna and said circuit.

11. In a system for receiving high frequency radiant energy, a substantially tubular casing adapted to be suspended from an aircraft, a removable closure for each end of said casing, and a doublet antenna having a pair of sections disposed in alignment with each other, the sections being carried by the respective removable end closures and projecting in opposite directions from said casing, and a detector device within said casing having the elements thereof extending substantially in alignment with the direction of axis of said sections.

12. In a system for receiving high frequency radiant energy, a high frequency radio receiver, a cylindrical casing for said receiver, a cap fitting over each end of said casing, a high frequency doublet including a pair of aligned sections, one of said sections being carried by each of said end caps, and means for establishing connection between the radio receiving apparatus in said casing and the sections of said doublet when said end caps carrying the sections of said doublet are mounted in position.

13. In a system for receiving high frequency radiant energy, a radio receiver casing adapted to be mounted on an aircraft, a radio receiver carried within said casing, a streamline closure member adapted to fit over each end of said casing, and a doublet antenna comprising a pair of aligned sections, one of said sections being carried by each of said streamline closure members, and connections between the radio receiving apparatus within said casing and the sections of said doublet antenna.

14. In a system for receiving high frequency radiant energy, a substantially tubular casing adapted to be suspended from an aircraft, a streamline closure for each end of said casing, and a doublet antenna having a pair of sections disposed in alignment with each other, the sections being carried by the respective streamline end closures and projecting in opposite directions from said casing.

15. In a system for receiving high frequency radiant energy, a substantially tubular casing adapted to be suspended from an aircraft, connecting means supported by said casing and extending axially in opposite directions therefrom, a pair of streamline closure members adapted to engage opposite ends of said tubular casing, and a doublet antenna having aligned sections, one of said sections being carried by one of said streamline closure members and the other of said sections being carried by the other of said streamline closure members, each of said sections terminating in a socket adapted to be engaged with said connecting means when said streamline closure members are engaged with said tubular casing.

16. In combination with a projector of ultra-high frequency energy generating in space a fan-shaped beam thrown across the path of an airplane flying or landing in conditions of poor visibility, substantially horizontal directive antennae installed under an aircraft and substantially parallel to the longitudinal axis thereof, detecting means connected with said antennae, and indicating means cooperating with said detecting means for indicating to a pilot the position of the aircraft with respect to the location of said fan-shaped beam.

17. In combination with a projector of ultra-high frequency energy generating in space a vertical beam and comprising as a radiator a substantially horizontal doublet spaced substantially a quarter wave above the ground or any horizontal reflecting conducting surface, detecting means on an aircraft associated with a substantially horizontal directive antenna installed under the structure of the aircraft and substantially parallel to the longitudinal axis of the aircraft, and indicating means cooperating with said detecting means to indicate to the navigator the location of the aircraft when the said aircraft is flown through the vertical beam in conditions of poor visibility with the axis of the antenna on the aircraft aligned with the axis of the doublet on the ground or adjacent said reflecting conducting surface.

18. In a system of blind landing of aircraft in combination with a detector of ultra-high frequency energy, a substantially horizontal antenna installed under the structure of an aircraft substantially parallel to its longitudinal axis, a similar antenna located on the ground and adapted to be continuously excited with ultra-high frequency energy for establishing a high frequency field of force substantially normal to the path of flight of the aircraft, the antenna on the aircraft being substantially alignable with the antenna on the ground by maneuvering the aircraft, and indicating means cooperating with said detecting means to indicate to the pilot the passage of the aircraft through the high frequency field established by the antenna on the ground.

19. In a landing system for aircraft in combination, a doublet directive transmitter for propagating a field of high-frequency energy vertically upward from a position adjacent a landing field in a plane substantially normal to the path of flight of an aircraft, and a doublet antenna carried by an aircraft having the elements of said doublet extending substantially parallel with the longitudinal axis of the aircraft for intercepting said propagated energy and an indicator on the aircraft actuated by energy received by said last mentioned doublet antenna.

20. In a blind landing system for aircraft which includes means for establishing high-frequency beams of energy for denoting location of aircraft with respect to the ground, a receiving system carried by aircraft and adapted to intercept established high frequency beams of energy, comprising an antenna, an electron tube device including a cathode, a control grid, an anode and a screen grid electrode, means for supplying operating potentials to said electrodes, an input circuit connecting certain of said electrodes with said antenna, a flash indicator, an output circuit connecting certain of said electrodes with said flash indicator, and means adjacent said flash indicator for modifying the potential on said screen grid electrode for producing a change in current in said output circuit for actuating said flash indicator independently of the interception of high-frequency energy by said antenna.

21. In a blind landing system for aircraft which includes means for establishing high-frequency beams of energy for denoting location of aircraft with respect to the ground, a receiving system carried by aircraft and adapted to intercept established high-frequency beams of energy, comprising an antenna, an electron tube device including a cathode, a control grid, an anode and a screen grid electrode, means for supplying operating potentials to said electrodes, an input circuit connecting certain of said electrodes with said antenna, a flash indicator, an output circuit connecting certain of said electrodes with said flash indicator, and means for modifying the potential supplied to said screen grid electrode for producing a change in current flow in said output circuit for operating said flash indicator independently of the interception of high-frequency energy by said antenna.

22. In a blind landing system for aircraft which includes means for establishing high-frequency beams of energy for denoting location of aircraft with respect to the ground, a receiving system carried by aircraft adapted to intercept established high-frequency beams of energy, comprising an antenna, an electron tube device including a cathode, a control grid, an anode and a screen grid electrode, means for supplying operating potentials to said electrodes, an input circuit connecting certain of said electrodes with said antenna, a flash indicator, an output circuit connecting certain of said electrodes with said flash indicator, and means for abruptly changing the potential applied to said screen grid electrode for producing a current impulse in said output circuit for operating said flash indicator independently of the interception of high-frequency energy by said antenna.

23. In a blind landing system for aircraft which includes means for establishing high-frequency beams of energy for denoting location of aircraft with respect to the ground, a receiving system carried by aircraft adapted to intercept established high-frequency beams of energy, comprising an antenna, an electron tube device including a cathode, a control grid, an anode and a screen grid electrode, means for supplying operating potentials to said electrodes, an input circuit connecting certain of said electrodes with said antenna, a flash indicator, an output circuit connecting certain of said electrodes with said flash indicator, a resistor disposed in a series path with said screen grid and with said potential supply means, a switch normally shunting said resistor for allowing normal operation of said electron tube device, said switch being movable to open position for introducing said resistor effectively in said series path and modifying the potential on said screen grid for producing a current fluctuation in said output circuit sufficient to actuate said flash indicator independently of the interception of high-frequency energy by said antenna.

24. In a blind landing system for aircraft which includes means for establishing high-frequency beams of energy for denoting location of aircraft with respect to the ground, a receiving system carried by aircraft adapted to intercept established high-frequency beams of energy, comprising an antenna, an electron tube device including a cathode, a control grid, an anode and a screen grid electrode, means for supplying operating potentials to said electrodes, an input circuit connecting certain of said electrodes with said antenna, a flash indicator, an output circuit connecting certain of said electrodes with said flash indicator, and means for abruptly decreasing the current flow to said screen grid for instantaneously increasing the current flow in said output circuit for actuating said flash indicator independently of the interception of high-frequency energy by said antenna.

25. An aircraft receiver for ultra-high-frequency energy comprising a streamline casing adapted to be mounted substantially parallel with the longitudinal axis of an aircraft, a doublet antenna having opposite sections thereof projecting from opposite ends of said streamline casing, and signal receiving apparatus housed within said streamline casing, and electrically connected with the opposite sections of said doublet antenna, a radiating system on the ground comprising a transmitter with a doublet antenna connected thereto extending in a direction for establishing a field of high frequency energy in a plane substantially normal to the path of flight of the aircraft, whereby the doublet antenna on the aircraft may be substantially aligned with the doublet antenna on the ground for receiving energy from the field of high-frequency energy established by the doublet antenna on the ground for actuating said signal receiving apparatus and indicating the position of the aircraft.

CONSTANTIN D. BARBULESCO.